3,549,350
METHOD OF TREATING SCRAP METAL
Sherwood W. McGee, Lisle, Ill., assignor to Burgess-Norton Mfg. Co., Geneva, Ill., a corporation of Illinois
No Drawing. Filed Apr. 4, 1967, Ser. No. 628,256
Int. Cl. B22f 9/00
U.S. Cl. 75—.5          13 Claims

ABSTRACT OF THE DISCLOSURE

The invention comprises a method of producing metal powder from metal scrap such as shop scrap and it is applied both to ferrous and nonferrous metals which are treated at suitable temperatures in the following steps:
(1) The metal is oxidized.
(2) The oxidized metal is crushed.
(3) The crushed oxidized metal is screened.
(4) After the material is oxidized, crushed and screened, it is reduced to its metallic form. The reduction is carried out under a controlled atmosphere such as dissociated ammonia, hydrogen or carbon monoxide, with or without lamp black or salt.
(5) The reduced metal is fragmented and finally screened to produce the desired size of product.

---

This invention relates to a method for producing powdered metal from scrap iron. An object is to provide a method of converting metal scrap to metal powder.

A further object of the invention is, therefore, to provide a method of utilizing scrap from ordinary shop operations so that this material, instead of being thrown away or treated as material of minimum value, is converted into metal powder and is thus reusable in a more valuable form than would otherwise be the case.

A still further object is to provide a method for converting metal shop scrap into usable metal powder and to utilize grease or other lubricant frequently present on shop scrap to assist in the conversion process.

A type of scrap with which the method of this application can be effectively used comprises ferrous scrap of light gauge, although the invention is not limited to light gauge material.

Commonly such ferrous scrap which remains after a manufacturing process has been carried out has upon it a quantity of lubricant or grease which is combustible and which may burn during the process and which thus has a value in carrying out the process.

The process is not limited to the precise steps of the method disclosed or to the variations in method disclosed below. However, one final product is a metal powder which is suitable for use in manufacture of molded and sintered parts. Other grades of such powder may be used for flame intensification, for catalysis, for shot blasting, for magnetic use, and in other applications which may even include remelting.

Although light gauge scrap has been mentioned, the invention is not limited to light gauge scrap and the method disclosed can be effectively carried out on relatively heavier types of material.

The method of the invention has been carried out in connection with ferrous and nonferrous material which is reducible to the metallic state. Hence both ferrous and nonferrous compounds may be used as the starting material in the process disclosed. One suitable example of the method as applied to ferrous material is described below.

Ferrous plant scrap remaining from manufacturing operations is utilized. It may be in the form of turnings or borings, lathe chips, grinding sludge, metal clippings, punch press scrap and other material remaining available after previous manufacturing operations. The plant scrap is converted to iron oxides by a process of controlled heating.

Although the plant scrap so used does not normally require prior crushing or cleaning, it may be crushed if desired. Organic wastes remaining on the material will contribute heat to the method as they are combusted during the heating steps of the method and this combustion of organic wastes present on the scrap material promotes rapid oxidation which is desired in this method.

In practical application of the process, it has been found that in the typical plant scrap of the kind described, the oxidation process proceeds exothermically, thus great heat economy is developed, and the process is further characterized by the great heat economy and the ability to use excess heat for oxidation of the heavier types of scrap.

In general, the method of this invention, whether it be carried out upon ferrous or nonferrous metal, includes the following steps:
(1) The metal is oxidized by controlled heating which may be exothermic or endothermic and it is generally preferable to accomplish oxidation rapidly, for example, in a matter of minutes.
(2) The oxidized material is crushed.
(3) Where the material includes undesirable particles such as alumina or silica grit from grinding or other operations, the material is given a suitable beneficiating treatment to remove the undesirable particles. Frequently the beneficiation treatment is not necessary but where necessary, it may be carried out in any desirable manner. For example, by (a) differential froth flotation
(b) electrostatic separation
(c) magnetic separation If beneficiation is necessary, the invention is not limited to any particular method of ridding the crushed oxide grit of the undesired products.

(4) The oxidized material, after crushing, with or without beneficiation, is screened to eliminate particles over the desired size, whatever size has been selected for the final product. The particle size of the material may be critical for the remaining steps of the process. Oversized material, after screening, may be recycled through the oxidizing process and again crushed. Experience has shown that the oversized material generally is not completely oxidized. Hence, it is useful to subject the oversized material to the recycling oxidizing step.

(5) The material, after oxidizing, crushing and screening is reduced to its metallic form. In the case of ferrous metal, the material is reduced to metallic iron. In general, reduction may be carried out under one of the five following conditions:

(a) under dissociated ammonia,
(b) under dissociated ammonia with added lamp black,
(c) under dissociated ammonia with NaCl,
(d) under pure hydrogen,
(e) under carbon monoxide containing atmospheres.

A portion of the reducing atmosphere may come from coke, metal carbonates, or hydrides mixed with the oxidized scrap for this purpose.

(6) After reducing, the powdered material is generally lightly caked. The lightly caked, reduced material is fragmented by any suitable means; one of which is the use of rotary wire brushes.

(7) After the reduced material has been fragmented, it is finally screened to the size desired for the final product.

The general steps of the method outlined above will be illustrated in more detail below. They have been outlined generally to indicate the main steps of the method and substantially these steps are carried out with ferrous and nonferrous material.

Several specific examples of successful methods include the following steps as applied to ferrous metals.

(1) The scrap material is heaped on hearth plates and is oxidized in still air at temperatures of the order of 1800° F. to 2100° F.

(2) The scrap material is placed in a tube muffle and is preheated to a temperature of the order of 1800° F. and is next oxidized in the presence of a relatively low pressure air blast at no more than 3 p.s.i.

(3) The scrap metal is placed in a tube muffle and is preheated to temperatures of the order of 1800° and is next oxidized in the presence of a high pressure air blast operating at pressures ranging from approximately 20 p.s.i. to 100 p.s.i.

(4) The scrap metal is conveyed in a direction counter to the air blast.

Each of the four steps just mentioned under 1, 2, 3 and 4 for carrying out the oxidation yields a useful product which may thereafter be crushed, screened, reduced, fragmented and screened again for final use. The variation listed above under the heading 1 produces the slowest reaction but the product from it is readily crushable. The variation listed above under 3 gives a much more rapid exothermic reaction which causes some melting of the scrap and the oxidized scrap but the material from this variation is less readily crushable than the material from variations 1 and 2.

Temperatures and reaction rates of the processes 2 and 3 above lend themselves readily to control by means of the variation of air blast pressure and volume employed. The product produced by variation 2 is intermediate the product produced by variations 1 and 3 both as to reaction time and crushability.

While the method is not limited in practice to the use of any particular equipment, practical experience has shown that suitable and improved efficiency can be realized, particularly in the oxidation process, in the following ways:

(1) By the use of an inclined rotary tube furnace which will permit the process to be continuously carried out rather than by separate blasts.

(2) The air blasts may be preheated using excess heat of the reaction.

(3) The air blast may be modified by the addition of steam which may or may not carry a proportion of hydrochloric acid or halogen salts. Modification such as the use of steam with hydrochloric acid or halogen salts tend to accelerate reaction rates in oxidation and tend also to break down refractory oxides which are sometimes encountered when the method of this invention is carried out upon high alloy scrap.

(4) In this modification, the scrap charge prepared for oxidation may be wet with water before treatment. It may be wet with halogen salts or with water and halogen salts together.

While the invention is not limited to the use of any particular crushing means, the crushing step has been satisfactorily carried out in practical experience by crushing in an up-running hammer mill and thereafter passing the crushed material through an 80 mesh screen. As mentioned above, material which does not pass through the screen may be recycled. Practical experience has shown that generally the hammer mill will crush at least ninety percent of the material fed to it on the first pass. If a finer oxide product is desired, the product at this point may be fed to a gyratory crushing mill or rod or ball mill to yield oxide powders to —100 mesh and down through —325 mesh.

It is possible to separate a proportion of nonferrous oxide material by one or more of the methods or variations above outlined. Such material may, for example, comprise MnO or $Cr_2O_3$ which are frequently present from alloy elements in the scrap which is treated. Such materials may be removed so that the resulting powder metal will comprise a higher purity of ferrous or nonferrous material, such, for example, as iron or copper.

As pointed out above in the general statement of the steps of the method, the oxide is reduced to metallic iron or to other metal if the scrap comprises nonferrous metal. Thus following crushing, screening and beneficiation, if beneficiation is carried out, the oxide is reduced to metallic iron or to other metallic nonferrous metal. The reduction may be carried out under the following conditions.

(1) The reduction is carried out under dissociated ammonia within a temperature range of the order of 1650° F. to 2100° F.

(2) The reduction is carried out under dissociated ammonia having .10 percent lamp black admixed with the oxide of the metal. The carbon lamp black is blended with the oxide and the reduction temperatures are of the order of 1650° F. to 2100° F. Coke may be substituted for lamp black.

(3) The reduction is carried out under dissociated ammonia having 1.0% NaCl powder which is mixed and blended with the oxide to be reduced. The heating of this mixture is carried out within the temperature range of the order of 1650° F. to 2100° F.

(4) The reduction is carried out under pure hydrogen in the temperature range of from 1650° F. to 2100° F.

(5) The reduction is carried out in carbon monoxide containing atmospheres within the temperature ranges of from 1650° F. to 2100° F. in addition to hydrogen and dissociated ammonia.

The five variations of the reduction step above set out may be carried out in any suitable apparatus in which the atmospheres and temperatures mentioned can properly and consistently be produced and maintained. The invention is, therefore, not limited to carrying out the method in any particular apparatus.

All of the processes for reduction mentioned above under 1, 2, 3, 4 and 5, have in practical use produced commercially satisfactory metallic powder. As above mentioned, the powders emerging from the reduction process are in a lightly caked condition and they are therefore fragmented by a rotary wire brush or by other fragmenting means and are screened, for example, through an 80 mesh screen. Upon completion of this final screening step, the metallic powder is suitable for use and comprises, for example, a suitable molding type powder.

Experience has indicated that the most compressible powders have been obtained by pure hydrogen reduction process at temperatures of the order of 2100° F. The addition of lamp black above tends to accelerate the reduction action, while the addition of NaCl tends to improve compressibility of the resulting metallic powder.

It has been stated that the method of this invention can be carried out with nonferrous as well as ferrous metals. An example of a nonferrous metal upon which the method may be carried out is copper. The same steps described above will be carried out with copper but different temperature ranges will be used. The oxidizing temperature range suitable for use with copper are of the order of 1400° F. to 1900° F. and the reducing temperatures for copper are of the order of 1100° F. to 1600° F.

While the steps and variations of the method above enumerated have produced satisfactory commercial metallic powders, the invention is not limited to the precise example above set out. Variations of the atmosphere including both endothermically and exothermically combusted methane and atmospheres derived from combustion of carbon additions such as pitch or coke powder added to the oxide to be reduced satisfactorily results in reducing the oxide powder.

It is recognized that under certain conditions, the raw plant scrap produced by machining and other shop operations may be simply crushed directly to the size desired for the end metallic powder product. This may be carried out without the intervening step of oxidation and reduction. In practice however, it has been found that such direct crushing to suitable particle size to produce metallic powder requires substantial investment in machinery and tends to be slow and requires large amounts of power per unit weight of the product. Thus the direct crushing of the scrap to convert it to metallic powder can be done effectively at high costs. Therefore, the method and variations above set out including the exothermic oxide conversion and the single pass crushing step outlined above have in practice been found to produce the end product much more economically than it can be porduced by the direct crushing or attrition process.

While the preferred form of the invention has been described, it should be realized that there are many modifications, alterations and substitutions possible within the scope of the claims.

What is claimed is:
1. In a method of producing metal powder from scrap, the steps of
   assembling scrap containing combustible material such as organic wastes,
   initiating oxidation of the combustible material containing scrap by the application of sufficient heat thereto to insure exothermic oxidation,
   particulating the exothermically oxidized scrap by crushing,
   thereafter size screening said crushed oxide to eliminate particles above a desired size,
   reducing the metallic oxide particles to metallic form by the application of heat thereto while subjecting said particles to a reducing environment, and
   thereafter fragmenting the resultant product.
2. The method of claim 1 further characterized,
   firstly, in that the scrap is oxidized by exposure to a gaseous oxidizing medium impelled by pressures ranging from 0 p.s.i.g. to on the order of 100 p.s.i.g.,
   secondly, in that said oxidation is carried out at temperatures ranging from about 1400° F. to 2100° F.,
   thirdly, in that the reduction is carried out under one of the environments selected from the group consisting essentially of pure hydrogen, disassociated ammonia, disassociated ammonia in the presence of lamp black or coke mixed with the oxide, disassociated ammonia in the presence of NaCl mixed with the oxide, and carbon monoxide containing atmospheres in addition to hydrogen and disassociated ammonia, and
   fourthly, in that the reduction is carried out at temperatures on the order of 1100° F. to 2100° F.
3. The method of claim 1 or 2 further including the step of
   removing undesirable particles, if any, after crushing of the oxidized particles.
4. The method of claim 1 further characterized in that the scrap is oxidized in still air at temperatures of the order of 1800° F. to 2100° F.
5. The method of claim 1 further including the step of preheating the scrap prior to oxidation, and further characterized in that the scrap is oxidized by subjection to one of the environments selected from the group consisting essentially of a low pressure air blast of no more than 3 p.s.i.g., and a high pressure air blast of approximately 20 p.s.i.g. to 100 p.s.i.g.
6. The method of claim 5 further including the step of conveying the scrap in a direction counter to the oxidizing air blast.
7. The method of claim 5 further characterized in that the air blast is modified by the addition of a further constituent selected from the group consisting essentially of steam, steam and hydrochloric acid, and steam and halogen salts.
8. The method of claim 7 further including the step of wetting the scrap prior to oxidation by a wetting agent selected from the group consisting essentially of water, halogen salts, and a combination of water and halogen salts.
9. The method of claim 2 further characterized
   firstly, in that the scrap is ferrous,
   secondly, in that oxidation is carried out at temperatures ranging from about 1800° F. to 2100° F., and
   thirdly, in that reduction is carried out at temperatures on the order of 1650° F. to 2100° F.
10. The method of claim 9, further characterized
   firstly, in that reduction is carried out under one of the environments selected from the group consisting essentially of pure hydrogen, disassociated ammonia, carbon monoxide containing atmospheres, and hydrogen containing atmospheres acting upon oxide material containing lamp black or NaCl, and
   secondly, in that the reduction is carried out at a temperature of the order of 2100° F.
11. The method of claim 2 further characterized
   firstly, in that the scrap is copper,
   secondly, in that oxidation is carried out at temperatures of the order of 1400° F. to 1900° F., and
   thirdly, in that reduction is carried out at temperatures of the order of 1100° F. to 1600° F.
12. The method of claim 1 further including the step of
   screening the resultant metallic product after fragmenting.
13. The method of claim 1 further including the step of
   crushing the scrap prior to oxidation.

References Cited

UNITED STATES PATENTS

| | | | |
|---|---|---|---|
| 1,453,057 | 4/1923 | Williams | 75—0.5 |
| 2,852,418 | 9/1958 | MacDonald | 75—0.5 |
| 2,853,767 | 9/1958 | Burkhammer | 75—0.5 |
| 3,066,022 | 11/1962 | Yamazaki | 75—0.5 |

L. DeWAYNE RUTLEDGE, Primary Examiner

W. W. STALLARD, Assistant Examiner